United States Patent
Patel et al.

(10) Patent No.: US 7,514,389 B2
(45) Date of Patent: *Apr. 7, 2009

(54) HIGH PERFORMANCE WATER-BASED DRILLING MUD AND METHOD OF USE

(75) Inventors: Arvind D. Patel, Sugarland, TX (US); Emanuel Stamatakis, Houston, TX (US); Steven Young, Cypress, TX (US)

(73) Assignee: M-I L.L.C., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/570,562

(22) PCT Filed: Sep. 1, 2004

(86) PCT No.: PCT/US2004/028330

§ 371 (c)(1), (2), (4) Date: Nov. 15, 2006

(87) PCT Pub. No.: WO2005/023958

PCT Pub. Date: Mar. 17, 2005

(65) Prior Publication Data

US 2007/0082823 A1 Apr. 12, 2007

Related U.S. Application Data

(63) Continuation of application No. 10/654,505, filed on Sep. 3, 2003, now Pat. No. 7,192,907.

(51) Int. Cl.
*C09K 8/035* (2006.01)
*C09K 8/04* (2006.01)

(52) U.S. Cl. .................. 507/129; 507/222; 507/239; 507/240; 507/266

(58) Field of Classification Search .................. None
See application file for complete search history.

(56) References Cited

U.S. PATENT DOCUMENTS 4,311,805 A * 1/1982 Moritani et al. ............. 525/60
7,192,907 B2 * 3/2007 Patel et al. .................. 507/222
2002/0092681 A1 * 7/2002 Patel et al. .................. 175/64
2007/0129258 A1 * 6/2007 Patel et al. .................. 507/129

OTHER PUBLICATIONS

RD 384041 A: "Vinyl:amine homopolymers, copolymers and derivatised/functionalised polymers used as well additives—are produced by esterification of vinyl alcohol units in poly:vinyl:amine alcohol with carboxylic acid;" Apr. 10, 1996 (Anonymous).*
Research Disclosure 384041 (full document): "Vinylamine homopolymers, copolymers and derivatized/functionalized polymers as well additives"; Anonymous; Apr. 1996.*

* cited by examiner

*Primary Examiner*—Michael J Feely

(57) ABSTRACT

A water based drilling fluid for use in drilling a subterranean well through a subterranean formation that swells in the presence of water, the drilling fluid is formulated to include: an aqueous based continuous phase; a weight material; an optional shale hydration inhibition agent and a shale encapsulator. The shale encapsulator has the formula:

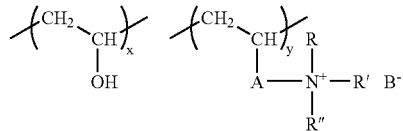

in which x and y have a value so that the molecular weight of the cation is in the range of about 10,000 to about 200,000 AMU; A is selected from $C_1$-$C_6$ alkyl, $C_2$-$C_6$ ether or $C_2$-$C_6$ amide; R, R' and R" are independently selectable $C_1$-$C_3$ alkyl; and B⁻ is a charge balancing anion to the quatenary amine. The shale hydration inhibition agent and the shale encapsulator may be present in sufficient concentrations to reduce the swelling of the subterranean formation in the presence of water. Conventional additives may be included into the formulation of the drilling fluid, including: fluid loss control agents, alkaline reserve and other pH control agents, bridging agents, lubricants, anti-bit balling agents, corrosion inhibition agents, surfactants, solids suspending agents, and mixtures and combinations of these and other similar additives.

12 Claims, No Drawings

HIGH PERFORMANCE WATER-BASED DRILLING MUD AND METHOD OF USE

This application is a National Stage application of PCT/US04/28330, filed Sep. 01, 2004, which is a continuation of U.S. Ser. No. 10/654,505, filed Sep. 3, 2003, now U.S. Pat. No. 7,192,907.

BACKGROUND

In rotary drilling of subterranean wells numerous functions and characteristics are expected of a drilling fluid. A drilling fluid should circulate throughout the well and carry cuttings from beneath the bit, transport the cuttings up the annulus, and allow their separation at the surface. At the same time, the drilling fluid is expected to cool and clean the drill bit, reduce friction between the drill string and the sides of the borehole, and maintain stability in the borehole's uncased sections. The drilling fluid should also form a thin, low permeability filter cake that seals openings in formations penetrated by the bit and act to reduce the unwanted influx of formation fluids from permeable rocks, by having a controllable density to compensate for subterranean pressures.

Drilling fluids are typically classified according to their base material. In oil based fluids, solid particles are suspended in oleophilic materials (oil), and water or brine may be emulsified within the oil. The oil is typically the continuous phase. In water-based fluids, solid particles are suspended in water or brine, and oil may be emulsified in the water. The water or brine is typically the continuous phase. Pneumatic fluids are a third class of drilling fluids in which a high velocity stream of air or natural gas aids in the removal of drill cuttings.

Three types of solids are usually found in water base drilling fluids: 1) clays and organic colloids added to provide necessary viscosity and filtration properties; 2) heavy minerals whose function is to increase the drilling fluid's density; and 3) formation solids that become dispersed in the drilling fluid during the drilling operation.

The formation solids that become dispersed in a drilling fluid are typically from the cuttings produced by the drill bits action and the solids produced by borehole instability. Where the formation solids are clay minerals that swell or disperse, the presence of either type of formation solids in the drilling fluid can greatly increase drilling time and costs.

Clay minerals are generally crystalline in nature. The structure of the clays crystals determines its properties. Typically, clays have a flaky, mica-type structure. Clay flakes are made up of a number of crystal platelets stacked face-to-face. Each platelet is called a unit layer, and the surfaces of the unit layer are called basal surfaces.

A unit layer is composed of multiple sheets. One type of sheet is called the octahedral sheet, it is composed of either aluminum or magnesium atoms octahedrally coordinated with the oxygen atoms of hydroxyls. Another type of sheet is called the tetrahedral sheet. The tetrahedral sheet consists of silicon atoms tetrahedrally coordinated with oxygen atoms.

Sheets within a unit layer link together by sharing oxygen atoms. When this linking occurs between one octahedral and one tetrahedral sheet, one basal surface consists of exposed oxygen atoms while the other basal surface has exposed hydroxyls. It is also quite common for two tetrahedral sheets to bond with one octahedral sheet by sharing oxygen atoms. The resulting structure, known as the Hoffman structure, has an octahedral sheet that is sandwiched between the two tetrahedral sheets. As a result, both basal surfaces in a Hoffman structure are composed of exposed oxygen atoms.

The unit layers stack together face-to-face and are held in place by weak attractive forces. The distance between corresponding planes in adjacent unit layers is called the c-spacing. A clay crystal structure with a unit layer consisting of three sheets typically has a c-spacing of about $9.5 \times 10^{-7}$ mm.

In clay mineral crystals, atoms having different valences commonly will be positioned within the sheets of the structure to create a negative potential at the crystal surface. In this case, a cation is adsorbed on the surface. These adsorbed cations are called exchangeable cations because they may chemically trade places with other cations when the clay crystal is in an aqueous environment. In addition, ions may also be adsorbed on the clay crystal edges and exchange with other ions in the water.

The type of substitutions occurring within the clay crystal structure and the exchangeable cations adsorbed on the crystal surface greatly affect clay swelling, a property of primary importance in the drilling fluid industry. Clay swelling is a phenomenon in which water molecules surround a clay crystal structure and position themselves to increase the structure's c-spacing thus resulting in an increase in volume. Two types of swelling may occur.

Surface hydration is one type of swelling in which water molecules are adsorbed on crystal surfaces. Hydrogen bonding holds a layer of water molecules to the oxygen atoms exposed on the crystal surfaces. Subsequent layers of water molecules align to form a quasi-crystalline structure between unit layers which results in an increased c-spacing. Virtually all types of clays swell in this manner.

Osmotic swelling is a second type of swelling. Where the concentration of cations between unit layers in a clay mineral is higher than the cation concentration in the surrounding water, water is osmotically drawn between the unit layers and the c-spacing is increased. Osmotic swelling results in larger overall volume increases than surface hydration. However, only certain clays, like sodium montmorillonite, swell in this manner.

Exchangeable cations found in clay minerals are reported to have a significant impact on the amount of swelling that takes place. The exchangeable cations compete with water molecules for the available reactive sites in the clay structure. Generally cations with high valences are more strongly adsorbed than cations with low valences. Thus, clays with low valence exchangeable cations will swell more than clays whose exchangeable cations have high valences.

In the North Sea and the United States Gulf Coast, drillers commonly encounter argillaceous sediments in which the predominant clay mineral is sodium montmorillonite (commonly called "gumbo shale"). Sodium cations are predominately the exchangeable cations in gumbo shale. As the sodium cation has a low positive valence (i.e. formally a +1 valence), it easily disperses into water. Consequently, gumbo shale is notorious for its swelling.

Clay swelling during the drilling of a subterranean well can have a tremendous adverse impact on drilling operations. The overall increase in bulk volume accompanying clay swelling impacts the stability of the borehole, and impedes removal of cuttings from beneath the drill bit, increases friction between the drill string and the sides of the borehole, and inhibits formation of the thin filter cake that seals formations. Clay swelling can also create other drilling problems such as loss of circulation or stuck pipe and increased viscosity of the drilling-fluid that slow drilling and increase drilling costs. Thus, given the frequency in which gumbo shale is encountered in drilling subterranean wells, the development of a substance and method for reducing clay swelling remains a continuing challenge in the oil and gas exploration industry.

One method to reduce clay swelling is to use salts in drilling fluids. Salts generally reduce the swelling of clays. However, salts can flocculate the clays resulting in both high fluid losses and an almost complete loss of thixotropy. Further, increasing salinity often decreases the functional characteristics of drilling fluid additives.

Another method for controlling clay swelling is to use organic shale inhibitor molecules in drilling fluids. It is believed that the organic shale inhibitor molecules are adsorbed on the surfaces of clays with the added organic shale inhibitor competing with water molecules for clay reactive sites and thus serve to reduce clay swelling.

Organic shale inhibitor molecules can be cationic, anionic, or nonionic. Cationic organic shale inhibitors dissociate into organic cations and inorganic anions, while anionic organic shale inhibitors dissociate into inorganic cations and organic anions. Nonionic organic shale inhibitor molecules do not dissociate.

It is important that the driller of subterranean wells be able to control the rheological properties of drilling fluids by using additives, including organic shale inhibitor molecules. In the oil and gas industry today it is desirable that additives work both onshore and offshore and in fresh and salt water environments. In addition, as drilling operations impact plant and animal life, drilling fluid additives should have low toxicity levels and should be easy to handle and to use to minimize the dangers of environmental pollution and harm to operators. Any drilling fluid additive should also provide desirable results but should not inhibit the desired performance of other additives. The development of such additives will help the oil and gas industry to satisfy the long felt need for superior drilling fluid additives which act to control the swelling of the clay and drilled formations without adversely effecting the rheological properties of drilling fluids. The claimed subject matter addresses this need.

SUMMARY

The subject matter of the present disclosure is generally directed to a water based drilling fluid for use in subterranean wells that penetrate a subterranean formation that swells and/or disperses in the presence of water. The drilling fluids of the present disclosure include: an aqueous based continuous phase; a weight material; an optional shale hydration inhibition agent; and a shale encapsulator in which the shale hydration inhibition agent and the shale encapsulator are present in sufficient concentrations to reduce the swelling and dispersion of the subterranean formation in the presence of water. In the present illustrative embodiment, the shale encapsulator, preferably a quaternized polyvinyl alcohol having the formula:

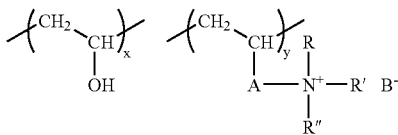

in which x and y have a value so that the molecular weight of the cation is in the range of about 10,000 to about 200,000 AMU; A is selected from $C_1$-$C_6$ alkyl $C_2$-$C_6$ ether or $C_2$-$C_6$ amide; R, R' and R" are independently selectable $C_1$-$C_3$ alkyl; and B⁻ is a charge balancing anion.

In a preferred embodiment, the shale encapsulator preferably a quaternized polyvinyl alcohol having the formula:

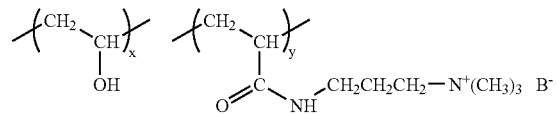

in which x and y have a value so that the molecular weight of the cation is in the range of about 10,000 to about 200,000 AMU; and B⁻ is a charge balancing anion. Preferably the B⁻ is an anion selected from the group of halogen ion, sulfate ion, nitrate ion, formate ion, citrate ion, acetate ion, methylsulfonate ion, and mixtures of these and more preferably B⁻ is a halogen ion. The shale encapsulator should be at least partially soluble in the aqueous continuous phase in order for it to be effective. The optional shale hydration inhibitor is selected from a wide variety of well known shale inhibition as well as mixtures and combinations of these and similar shale inhibiting compounds that should be known to one of skill in the art. The illustrative drilling fluid is composed such that the aqueous based continuous phase is selected from: fresh water, sea water, brine, mixtures of water and water soluble organic compounds as well as mixtures and combinations of these and similar compounds that should be known to one of skill in the art. Further the illustrative drilling fluid optionally contains a fluid loss control agent selected from the group consisting of organic polymers, starches, as well as mixtures and combinations of these and similar compounds that should be known to one of skill in the art. The weight material serves to increase the density of the illustrative drilling fluid and may be selected from barite, hematite, iron oxide, calcium carbonate, magnesium carbonate, organic and inorganic salts, calcium chloride, calcium bromide, magnesium chloride, zinc halides as well as mixtures and combinations of these and similar compounds that should be known to one of skill in the art. Finally it should be noted that illustrative drilling fluid may contain other components that are conventional to the formulation of aqueous based drilling fluids. Examples of such components include: emulsifiers, suspension agents, viscosifying agents, fluid loss control agents, as well as mixtures and combinations of these and similar components that should be known to one of skill in the art.

It will also be appreciated by one of ordinary skill in the art that the claimed subject matter includes a method of forming a subterranean well utilizing the drilling fluids disclosed herein. One such illustrative method includes: drilling the subterranean well with a rotary drill bit and a drilling fluid as is substantially disclosed above. In one preferred illustrative embodiment, the drilling fluid includes: an aqueous based continuous phase; an optional shale hydration inhibition agent; and a shale encapsulator. The illustrative drilling fluid is formulated such that the shale hydration inhibition agent and the shale encapsulator should be present in a ratio and in sufficient concentrations to reduce the swelling of shale clay encountered during the drilling of the subterranean well. The shale encapsulator of the illustrative fluid is preferably a quaternized polyvinyl alcohol having the formula:

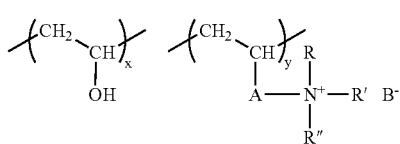

in which x and y have a value so that the molecular weight of the cation is in the range of about 10,000 to about 200,000 AMU and preferably in the range of about 25,000 to about 150,000 AMU, A is selected from $C_1$-$C_6$ alkyl, $C_2$-$C_6$ ether or $C_2$-$C_6$ amide; R, R' and R" are independently selectable $C_1$-$C_3$ alkyl; and $B^-$ is a charge balancing anion. Preferably the $B^-$ is an anion selected from the group of halogen ion, sulfate ion, nitrate ion, formate ion, citrate ion, acetate ion, methylsulfonate ion, and mixtures of these and more preferably $B^-$ is a halogen ion. The shale encapsulator should be at least partially soluble in the aqueous continuous phase in order for it to be effective. The optional shale hydration inhibitor is selected from a wide variety of well known shale inhibition as well as mixtures and combinations of these and similar shale inhibiting compounds that should be known to one of skill in the art.

The claimed invention also encompasses a method of reducing the swelling of shale clay encountered during the drilling of a subterranean well. Further it should be appreciated that the claimed invention includes methods of using the disclosed fluids in the drilling of subterranean wells as well. Additionally the disclosed fluids may be used in a method of disposing of drilling solids in a subterranean formation in which the grinding of the drilling solids takes place in the presence of a water-based fluid, formulated as disclosed herein. The resulting slurry may then be injected into a subterranean formation.

These and other features of the claimed subject matter are more fully set forth in the following description of preferred or illustrative embodiments of the invention.

DESCRIPTION OF ILLUSTRATIVE EMBODIMENTS

The claimed subject matter is directed to an aqueous based drilling fluid for use in drilling wells through a formation containing a shale clay which swells in the presence of water. As the terms are used herein, shale, clay, shale clay, and gumbo shale have been used to describe hydrophilic rocks that may be encountered during the drilling of wells and which the drilling fluids of the claimed subject matter inhibit the swelling as described above. Generally the drilling fluid of the claimed subject matter includes an aqueous continuous phase; a weight material; a shale hydration inhibition agent; and a shale encapsulating agent. As disclosed below, the drilling fluids of the claimed subject matter may also include additional components, such as fluid loss control agents, bridging agents, lubricants, anti-bit baling agents, corrosion inhibition agents, surfactants and suspending agents and the like which may be added to an aqueous based drilling fluid.

The aqueous based continuous phase may generally be any water based fluid phase that is compatible with the formulation of a drilling fluid and is compatible with the shale hydration inhibition agents disclosed herein. In one preferred embodiment, the aqueous based continuous phase is selected from: fresh water, sea water, brine, mixtures of water and water soluble organic compounds and mixtures thereof. The amount of the aqueous based continuous phase should be sufficient to form a water based drilling fluid. This amount may range from nearly 100% of the drilling fluid to less than 30% of the drilling fluid by volume. Preferably, the aqueous based continuous phase is from about 95 to about 30% by volume and preferably from about 90 to about 40% by volume of the drilling fluid.

The drilling fluids of the claimed subject matter include a weight material in order to increase the density of the fluid. The primary purpose for such weighting materials is to increase the density of the drilling fluid so as to prevent kick-backs and blow-outs. One of skill in the art should know and understand that the prevention of kick-backs and blow-outs is important to the safe day to day operations of a drilling rig. Thus the weight material is added to the drilling fluid in a functionally effective amount largely dependent on the nature of the formation being drilled. Weight materials suitable for use in the formulation of the drilling fluids of the claimed subject matter may be generally selected from any type of weighting materials be it in solid, particulate form, suspended in solution, dissolved in the aqueous phase as part of the preparation process or added afterward during drilling. It is preferred that the weight material be selected from the group including barite, hematite, iron oxide, calcium carbonate, magnesium carbonate, organic and inorganic salts, and mixtures and combinations of these compounds and similar such weight materials that may be utilized in the formulation of drilling fluids.

A shale hydration inhibition agent is optionally included in the formulation of the drilling fluids of the claimed subject matter so that the hydration of shale and shale like formations is inhibited. Thus, the shale hydration inhibition agent should be present in sufficient concentration to reduce either or both the surface hydration based swelling and/or the osmotic based swelling of the shale clay. The exact amount of the shale hydration inhibition agent present in a particular drilling fluid formulation can be determined by a trial and error method of testing the combination of drilling fluid and shale clay formation encountered. Generally however, the shale hydration inhibition agent of the claimed subject matter may be used in drilling fluids in a concentration from about 1 to about 18 pounds per barrel (lbs/bbl or ppb) and more preferably in a concentration from about 2 to about 12 pounds per barrel of drilling fluid. Illustrative shale inhibition agents may be selected from such compounds that are well known to one of skill in the art as well as combinations of these and similar compounds that should be know to one of skill in the art.

A shale encapsulator is included in the formulation of the aqueous based drilling fluids of the claimed subject matter. The role of the shale encapsulator is to encapsulate, i.e. coat or cover on a molecular level, the surface of the drilled shale solids and thus at least partially inhibit swelling and/or dispersion or aid in the action of conventional shale inhibitors. This is accomplished by creating a molecule that has a polymeric backbone made of hydrocarbon, such as polyethylene on to which polar organic pendent groups are attached. While not intending to be bound by any specific theory of action, it is believed that this combination of molecular structure results in the strong adherence of the shale encapsulator to the shale drilling solid's surface, by way of the polar organic group. As a result, the drilled shale solids is encapsulated in a molecular polymer coating that enhances the action of the shale inhibitor and thus prevents water molecules from swelling the shale and mechanical action from dispersing the shale. Alternatively it has been speculated that the shale encapsulating compounds form molecular cross-links between the shale/clay mineral crystals, thus effectively locking their relative position. By doing so, water is less able to penetrate the spaces between the mineral crystals and thus swelling and/or dispersion of the shale is inhibited. Regardless of the actual theory of action, the shale encapsulators of the claimed subject matter are preferably a quaternized polyvinyl alcohol having a generalized molecular structure of:

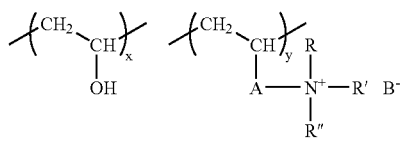

in which x and y have a value so that the molecular weight of the cation is in the range of about 10,000 to about 200,000 AMU and preferably in the range of about 25,000 to about 150,000 AMU, A is selected from $C_1$-$C_6$ alkyl, $C_2$-$C_6$ ether or $C_2$-$C_6$ amide; R, R' and R" are independently selectable $C_1$-$C_3$ alkyl; and $B^-$ is a charge balancing anion.

In a preferred and illustrative embodiment, the quaternized polyvinyl alcohol molecular structure has the formula:

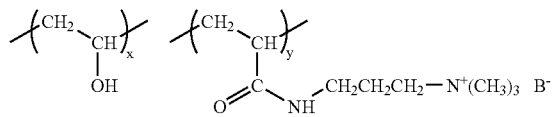

in which x and y have a value so that the molecular weight of the cation is in the range of about 10,000 to about 200,000 AMU; and $B^-$ is an anion selected to counterbalance the positive charge of the quaternary amine. Suitable examples of anions that are useful include halogen ion, sulfate ion, nitrate ion, formate ion, citrate ion, acetate ion, methylsulfonate ion, as well as combinations of these and other similar compounds that should be well known to one of skill in the art. The application of polyvinyl alcohol (PVA) derivatives such as those indicated above are believed to be known as shale inhibitors or encapsulators. The use of PVA in combination with the potassium ion is reported in the literature, however, the toxicity of the potassium ion limits its application in certain areas of the world and PVA alone is ineffective in preventing shale hydration. The synthesis of such compounds are well known based on the copolymerization of amine based monomers and vinyl acetate to produce amine or quaternized amine derivatives of PVA. One of skill in the art should also appreciate that PVA can be reacted with acrylonitrile and the subsequent product hydrogenated to produce amine based PVA. By varying the molecular weight and degree of amination, a wide variety of products with a corresponding spectrum of shale inhibiting properties will be produced. By systematically doing this, one of skill will be able to create shale encapsulators for use in low salinity (including fresh water) or low conductivity aqueous based drilling fluids which in the past have been the most difficult to control shale swelling and/or dispersion.

In addition to the components noted above, the claimed drilling fluids may also be formulated to include materials generically referred to as gelling materials, thinners, and fluid loss control agents, as well as other compounds and materials which are optionally added to water base drug fluid formulations. Of these additional materials, each can be added to the formation in a concentration as rheologically and functionally required by drilling conditions. Typical gelling materials used in aqueous based drilling fluids are bentonite, sepiolite, clay, attapulgite clay, anionic high-molecular weight polymers and biopolymers.

Thinners such as lignosulfonates are also often added to water-base drilling fluids. Typically lignosulfonates, modified lignosulfonates, polyphosphates and tannins are added. In other embodiments, low molecular weight polyacrylates can also be added as thinners. Thinners are added to a drilling fluid to reduce flow resistance and control gelation tendencies. Other functions performed by thinners include reducing filtration and filter cake thickness, counteracting the effects of salts, minimizing the effects of water on the formations drilled, emulsifying oil in water, and stabilizing mud properties at elevated temperatures.

A variety of fluid loss control agents may be added to the drilling fluids of the claimed subject matter that are generally selected from a group consisting of synthetic organic polymers, biopolymers, and mixtures thereof. Fluid loss control agents such as modified lignite, polymers, starches, modified starches and modified celluloses may also be added to the water base drilling fluid system of this invention. In one embodiment it is preferred that the additives of the invention should be selected to have low toxicity and to be compatible with common anionic drilling fluid additives such as polyanionic carboxymethylcellulose (PAC or CMC), polyacrylates, lignosulfonates, xanthan gum, mixtures of these and the like.

The drilling fluid of the claimed subject matter may further contain an encapsulating agent generally selected from the group consisting of synthetic organic, and bio-polymers and mixtures thereof. The role of the encapsulating agent is to absorb at multiple points along the chain onto the clay particles, thus binding the particles together and encapsulating the cuttings. These encapsulating agents help improve the removal of cuttings with less dispersion of the cuttings into the drilling fluids. The encapsulating agents may be anionic, cationic, amphoteric, or non-ionic in nature.

Other additives that could be present in the drilling fluids of the claimed subject matter include products such as lubricants, penetration rate enhancers, defoamers, corrosion inhibitors and loss circulation products. Such compounds should be known to one of ordinary skill in the art of formulating aqueous based drilling fluids.

The method of use of the above-disclosed fluids as drilling fluids is contemplated as being within the scope of the claimed subject matter. Such use would be conventional to the art of drilling subterranean wells and one having skill in the art should appreciate such processes and applications. The use of the above fluids in the slurification and disposal of drilling cuttings containing swellable shale clays is also contemplated. It is also contemplated that these fluids may be used in a wide variety of subterranean well operations in which the prevention of the swelling of gumbo shale clays and other similar formations is desired. Such uses include use as a packing fluid, fracturing fluid, reworking fluid, well bore recompletion fluid and the like where the properties of the fluid will be useful.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

Unless otherwise stated, all starting materials are commercially available and standard laboratory techniques and equipment are utilized. The tests were conducted in accordance with the procedures in API Bulletin RP 13B-2, 1990.

The following abbreviations are sometimes used in describing the results discussed in the examples:

"PV" is plastic viscosity (CPS) which is one variable used in the calculation of viscosity characteristics of a drilling fluid.

"YP" is yield point (lbs/100 ft$^2$) which is another variable used in the calculation of viscosity characteristics of drilling fluids.

"GELS" (lbs/100 ft$^2$) is a measure of the suspending characteristics and the thixotropic properties of a drilling fluid.

"F/L" is API fluid loss and is a measure of fluid loss in milliliters of drilling fluid at 100 psi.

"Encapsulator A" is a conventional encapsulator a quaternary polyacrylamide.

"PVA" is polyvinyl alcohol having a molecular weight comparable to that of the compounds of the present invention. (i.e. 10,000 to 200,000 AMU).

"PVA-Quat" is a quaternized polyvinyl alcohol as disclosed herein.

EXAMPLE 1

The following muds are formulated to illustrate the claimed subject matter:

|  | A | B | C |
|---|---|---|---|
| Fresh Water (ml) | 350 | 350 | 350 |
| Shale Inhibitor (g) | 7.0 | 7.0 | 7.0 |
| Biopolymer (g) | 1.0 | 1.0 | 1.0 |
| PHPA (Partially hydrated polyacryl amide) | 2.0 | — | — |
| Shale Encapsulator - PVA (g) | — | 2.0 | — |
| Shale Encapsulator - PVA-Quat (g) | — | — | 2.0 |
| Lime (g) | * | * | * |

* sufficient lime was added to obtain a pH value of 11.5.

The properties of the above mud formulations were determined at room temperature after hot rolling for 16 hours at 150° F. Exemplary data is given in the following table:

| Mud Properties at room temp. | | A | B | C |
|---|---|---|---|---|
| Rheology at | 600 rpm (cps) | 59 | 14 | 17 |
| | 300 | 41 | 10 | 12 |
| | 200 | 35 | 9 | 9 |
| | 100 | 27 | 6 | 7 |
| | 6 | 12 | 3 | 3 |
| | 3 | 9 | 3 | 3 |
| Gels | 10 sec. | 12 | 3 | 3 |
| | 10 min. | 14 | 3 | 3 |
| PV | | 18 | 4 | 5 |
| YP | | 23 | 6 | 7 |
| pH | | 10.8 | 10.4 | 10.7 |

Upon review of the above data, one of skill in the art should appreciate that the state of the art shale encapsulator (PHPA) has excessive viscosity in the fluids.

Dispersion tests were run with Arne and Oxford cuttings by hot rolling 10 g of cuttings in a one-barrel equivalent of mud for 16 hours at 150° F. After hot rolling the remaining cuttings were screened using a 20 mesh screen and washed with 10% potassium chloride water, dried and then weighed to obtain the percentage recovered. The results of this evaluation are given in the following Table and shows the improved shale inhibition performance of shale inhibition agent (I) of this invention.

| (% cuttings recovered) | A | B | C |
|---|---|---|---|
| Arne | 29.5 | 66.1 | 94.8 |
| Oxford | 80.8 | 96.9 | 99.3 |

To further demonstrate the performance of the drilling fluids formulated in accordance with the teachings of this invention, a test using a bulk hardness tester was conducted. A BP Bulk Hardness Tester is a device designed to give an assessment of the hardness of shale cuttings exposed to drilling fluids, which in turn can be related to the inhibiting properties of the drilling fluid being evaluated. In this test, shale cutting are hot rolled in the test drilling fluid at 150° F. for 16 hours. Shale cuttings are screened and then placed into a BP Bulk Hardness Tester. The equipment is closed and using a torque wrench the force used to extrude the cuttings through a plate with holes in it is recorded. Depending on the hydration state and hardness of the cuttings and the drilling fluid used, a plateau region in torque is reached as extrusion of the cuttings begins to take place. Alternatively, the torque may continue to rise which tends to occur with harder cuttings samples. Therefore, the higher the torque number obtained, the more inhibitive the drilling fluid system is considered. Illustrative data obtained using the three different mud formulations with three different cuttings are given below.

| Arne Clay | Bulk Hardness: (values in inch/lbs) Mud Formulation | | |
|---|---|---|---|
| Turn No. | A | B | C |
| 9 | — | — | 10 |
| 10 | — | — | 45 |
| 11 | — | 35 | 50 |
| 12 | — | 50 | 75 |
| 13 | — | 60 | 85 |
| 14 | 10 | 90 | 150 |
| 15 | 10 | 150 | 240 |

| Oxford Clay | Bulk Hardness: (values in inch/lbs) Mud Formulation | | |
|---|---|---|---|
| Turn No. | A | B | C |
| 6 | — | 10 | 10 |
| 7 | — | 20 | 25 |
| 8 | — | 40 | 60 |
| 9 | 10 | 210 | 280 |
| 10 | 70 | 320 | 350 |
| 11 | 130 | 350 | — |
| 12 | 150 | Disk | Disk |
| 13 | 180 | — | — |
| 14 | 220 | — | — |
| 15 | 330 | — | — |

Upon review of the above data, one skilled in the art should observe that drilling fluids formulated according to the teachings of this invention prevent the hydration of various types of shale clays and thus are likely to provide good performance in drilling subterranean wells encountering such shale clays.

In view of the above disclosure, one of ordinary skill in the art should understand and appreciate that one illustrative embodiment of the claimed subject matter includes a water based drilling fluid for use in drilling a subterranean well through a subterranean formation that swells in the presence of water. The drilling fluid includes: an aqueous based continuous phase; a weight material; an optional shale hydration inhibition agent; and a shale encapsulator in which the shale hydration inhibition agent and the shale encapsulator are present in sufficient concentrations to reduce the swelling of the subterranean formation in the presence of water. In the present illustrative embodiment, the shale encapsulator is a quaternized polyvinyl alcohol having the formula:

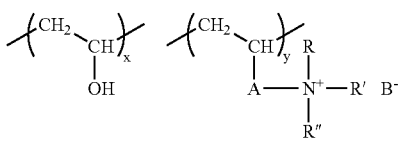

in which x and y have a value so that the molecular weight of the cation is in the range of about 10,000 to about 200,000 AMU and preferably in the range of about 25,000 to about 150,000 AMU, A is selected from $C_1$-$C_6$ alkyl, $C_2$-$C_6$ ether or $C_2$-$C_6$ amide; R, R' and R" are independently selectable $C_1$-$C_3$ alkyl; and $B^-$ is a charge balancing anion. Preferably the $B^-$ is an anion selected from the group of halogen ion, sulfate ion, nitrate ion, formate ion, citrate ion, acetate ion, methylsulfonate ion and mixtures of these and more preferably $B^-$ is a halogen ion. The shale hydration inhibitor is selected from compounds well known to one of skill in the art as well as mixtures and combinations of these and similar shale inhibiting compounds that should be known to one of skill in the art. The illustrative drilling fluid is composed such that the aqueous based continuous phase is selected from: fresh water, sea water, brine, mixtures of water and water soluble organic compounds as well as mixtures and combinations of these and similar compounds that should be known to one of skill in the art. Further the illustrative drilling fluid optionally contains a fluid loss control agent selected from the group consisting of organic polymers, starches, as well as mixtures and combinations of these and similar compounds that should be known to one of skill in the art. The weight material serves to increase the density of the illustrative drilling fluid and may be selected from barite, hematite, iron oxide, calcium carbonate, magnesium carbonate, organic and inorganic salts, calcium chloride, calcium bromide, magnesium chloride, zinc halides as well as mixtures and combinations of these and similar compounds that should be known to one of skill in the art. Finally it should be noted that illustrative drilling fluid may contain other components that are conventional to the formulation of aqueous based drilling fluids. Examples of such components include: emulsifiers, suspension agents, viscosifying agents, fluid loss control agents, as well as mixtures and combinations of these and similar components that should be known to one of skill in the art.

Another illustrative and preferred embodiment of the claimed subject matter includes a water based drilling fluid which includes: an aqueous based continuous phase; a weight material; an optional shale hydration inhibition agent; and a shale encapsulator, preferably a quaternized polyvinyl alcohol having the formula:

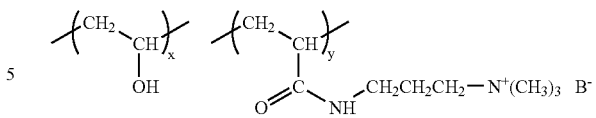

in which x and y have a value so that the molecular weight of the cation is in the range of about 10,000 to about 200,000 AMU; and preferably in the range of about 25,000 to about 150,000 AMU and $B^-$ is a charge balancing anion and $B^-$ preferably is an anion selected from the group of halogen ion, sulfate ion, nitrate ion, formate ion, citrate ion, acetate ion, methylsulfonate ion, and mixtures of these. The illustrative drilling fluid is formulated such that the optional shale hydration inhibition agent and the shale encapsulator are present in a ratio and are in sufficient concentrations to reduce the swelling of the subterranean formation in the presence of water. In one preferred embodiment, the shale hydration inhibitor is a conventional shale hydration inhibitor known to one of skill in the art well as mixtures and combinations of these and similar shale inhibiting compounds that should be known to one of skill in the art. The illustrative drilling fluid is composed such that the aqueous based continuous phase is selected from: fresh water, sea water, brine, mixtures of water and water soluble organic compounds as well as mixtures and combinations of these and similar compounds that should be known to one of skill in the art. Further the illustrative drilling fluid optionally contains a fluid loss control agent selected from the group consisting of organic polymers, starches, as well as mixtures and combinations of these and similar compounds that should be known to one of skill in the art. The weight material serves to increase the density of the illustrative drilling fluid and may be selected from barite, hematite, iron oxide, calcium carbonate, magnesium carbonate, organic and inorganic salts, calcium chloride, calcium bromide, magnesium chloride, zinc halides as well as mixtures and combinations of these and similar compounds that should be known to one of skill in the art. The illustrative drilling fluid further contains a fluid loss control agent selected from compounds including organic polymers, starches, as well as mixtures and combinations of these and similar components that should be known to one of skill in the art. Finally it should be noted that the illustrative drilling fluid may contain other components that are conventional to the formulation of aqueous based drilling fluids. Examples of such components include: emulsifiers, suspension agents, viscosifying agents, as well as mixtures and combinations of these and similar components that should be known to one of skill in the art.

It will also be appreciated by one of ordinary skill in the art that a present illustrative embodiment of the claimed subject matter includes a method of forming a subterranean well utilizing the drilling fluids disclosed herein. One such illustrative method includes: drilling the subterranean well with a rotary drill bit and a drilling fluid as is substantially disclosed above. In one preferred illustrative embodiment, the drilling fluid includes: an aqueous based continuous phase; an optional shale hydration inhibition agent; and a shale encapsulator. The illustrative drilling fluid is formulated such that the shale hydration inhibition agent and the shale encapsulator may be present in a ratio and are in sufficient concentrations to reduce the swelling of shale clay encountered during the drilling of the subterranean well. The shale encapsulator of the illustrative fluid preferably is a quaternized polyvinyl alcohol having the formula:

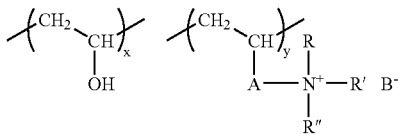

in which x and y have a value so that the molecular weight of the cation is in the range of about 10,000 to about 200,000 AMU and preferably in the range of about 25,000 to about 150,000 AMU, A is selected from $C_1$-$C_6$ alkyl $C_2$-$C_6$ ether or $C_2$-$C_6$ amide; R, R' and R" are independently selectable $C_1$-$C_3$ alkyl; and $B^-$ is a charge balancing anion. Preferably, $B^-$ is a charge balancing anion selected from the group of halogen ion, sulfate ion, nitrate ion, formate ion, citrate ion, acetate ion, methylsulfonate ion, as well as combinations of these and other similar compounds that should be well known to one of skill in the art.

The claimed invention also encompasses a method of reducing the swelling of shale clay encountered during the drilling of a subterranean well. Such an illustrated method includes circulating in the subterranean well an aqueous based drilling fluid that is formulated as is substantially described in the present disclosure. The illustrative aqueous based drilling fluid should be formulated to include: an aqueous based continuous phase; an optional shale hydration inhibition agent and a shale encapsulator such that the shale hydration inhibition agent and the shale encapsulator may be present in a ratio and in sufficient concentrations to reduce the swelling of the subterranean formation in the presence of water.

The shale encapsulator utilized in the illustrative drilling fluid is preferably a quaternized polyvinyl alcohol having the formula:

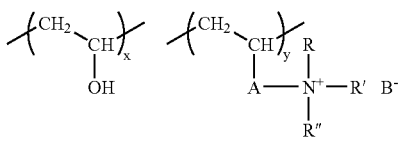

in which x and y have a value so that the molecular weight of the cation is in the range of about 10,000 to about 200,000 AMU and preferably in the range of about 25,000 to about 150,000 AMU, A is selected from $C_1$-$C_6$ alkyl, $C_2$-$C_6$ ether or $C_2$-$C_6$ amide; R, R' and R" are independently selectable $C_1$-$C_3$ alkyl; and $B^-$ is a charge balancing anion, preferably selected from the group of halogen ion, sulfate ion, nitrate ion, formate ion, citrate ion, acetate ion, methylsulfonate ion, as well as mixtures and combinations which should be known to one of skill in the art.

Further it should be appreciated that the claimed invention includes a method of disposing of drilling solids in a subterranean formation. In such an illustrative embedment, the method includes: grinding the drilling solids in a water-based fluid, formulated as disclosed herein, to form a slurry, and injecting said slurry into the subterranean formation. The water based fluid utilized in the illustrative embodiment includes: an aqueous based continuous phase, a shale hydration inhibition agent; and a shale encapsulator preferably a quaternized polyvinyl alcohol having the formula:

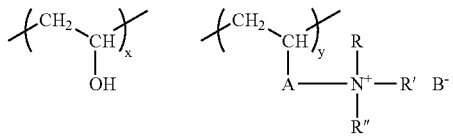

in which x and y have a value so that the molecular weight of the cation is in the range of about 10,000 to about 200,000 AMU and preferably in the range of about 25,000 to about 150,000 AMU, A is selected from $C_1$-$C_6$ alkyl, $C_2$-$C_6$ ether or $C_2$-$C_6$ amide; R, R' and R" are independently selectable $C_1$-$C_3$ alkyl; and $B^-$ is a charge balancing anion, preferably selected from the group of halogen ion, sulfate ion, nitrate ion, formate ion, citrate ion, acetate ion, methylsulfonate ion, and mixtures of these and similar compounds that should be well known to one of skill in the art.

While the apparatus, compositions, and methods disclosed above have been described in terms of preferred or illustrative embodiments, it will be apparent to those of skill in the art that variations may be applied to the process described herein without departing from the concept and scope of the claimed subject matter. All such similar substitutes and modifications apparent to those skilled in the art are deemed to be within the scope and concept of the subject matter as it is set out in the following claims.

What is claimed is:

1. A water based drilling fluid for use in drilling a subterranean well through a subterranean formation that swells in the presence of water, the drilling fluid comprising:
   an aqueous based continuous phase;
   a weight material selected from the group consisting of barite, hematite, iron oxide, calcium carbonate, magnesium carbonate, inorganic salts, calcium chloride, calcium bromide, magnesium chloride, zinc halides and combinations thereof;
   an optional shale hydration inhibition agent; and
   a shale encapsulator having the formula:

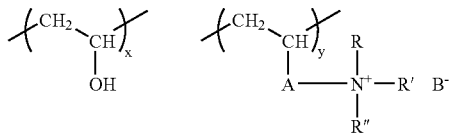

in which x and y have a value so that the molecular weight of the cation is in the range of about 10,000 to about 200,000 AMU; A is selected from $C_1$-$C_6$; alkyl, $C_2$-$C_6$ ether or $C_2$-$C_6$ amide; R, R' and R" are independently selectable $C_1$-$C_3$ alkyl; and $B^-$ is a charge balancing anion; and
   wherein the shale hydration inhibition agent and the shale encapsulator are present in sufficient concentrations to reduce the swelling of the subterranean formation in the presence of water.

2. The drilling fluid of claim 1, wherein $B^-$ is an anion selected from the group of halogen ions, sulfate ion, nitrate ion, formate ion, citrate ion, acetate ion, methylsulfonate ion, and mixtures of these.

3. The drilling fluid of claim 1, wherein $B^-$ is a halogen ion.

4. The drilling fluid of claim 1, wherein x and y have a value so that the molecular weight of the cation is in the range of about 25,000 to about 150,000 AMU.

5. The drilling fluid of claim 1, wherein the aqueous based continuous phase is selected from: fresh water, sea water, brine, mixtures of water and water soluble organic compounds and mixtures thereof.

6. The drilling fluid of claim 1, wherein the drilling fluid further contains a fluid loss control agent selected from the group consisting of organic polymers, starches, and mixtures thereof.

7. A water based drilling fluid for use in drilling a subterranean well through a subterranean formation that swells in the presence of water, the drilling fluid comprising:
   an aqueous based continuous phase;
   a weight material selected from the group consisting of barite, hematite, iron oxide, calcium carbonate, magnesium carbonate, inorganic salts, calcium chloride, calcium bromide, magnesium chloride, zinc halides and combinations thereof;
   an optional shale hydration inhibition agent; and
   a shale encapsulator having the formula:

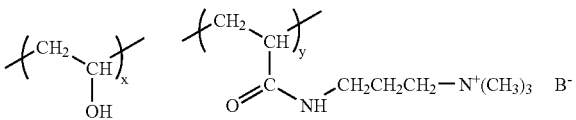

in which x and y have a value so that the molecular weight of the cation is in the range of about 10,000 to about 200,000 AMU;
   wherein B⁻ is an anion selected from the group consisting of halogen ion, sulfate ion, nitrate ion, formate ion, citrate ion, acetate ion, methylsulfonate ion, and mixtures thereof; and
   wherein the shale hydration inhibition agent and the shale encapsulator are present in a ratio to each other and are in sufficient concentrations to reduce the swelling of the subterranean formation in the presence of water.

8. The drilling fluid of claim 7, wherein B⁻ is a halogen ion.

9. The drilling fluid of claim 7, wherein x and y have a value so that the molecular weight of the cation is in the range of about 25,000 to about 150,000 AMU.

10. The drilling fluid of claim 7, wherein die aqueous based continuous phase is selected from: fresh water, sea water, brine, mixtures of water and water soluble organic compounds and mixtures thereof.

11. The drilling fluid of claim 7, wherein the drilling fluid further contains a fluid loss control agent selected from the group consisting of organic polymers, starches, and mixtures thereof.

12. A water based drilling fluid for use in drilling a subterranean well through a subterranean formation, which swells in the presence of water, the drilling fluid comprising:
   an aqueous based continuous phase;
   a weight material selected from the group consisting of barite, hematite, iron oxide, calcium carbonate, magnesium carbonate, inorganic salts, calcium chloride, calcium bromide, magnesium chloride, zinc halides and combinations thereof;
   an optional shale hydration inhibition agent; and
   a quatenary amine based, water soluble polyvinyl alcohol shale encapsulator in which the cation of the polyvinyl alcohol quatenary amine has a molecular weight range of about 10,000 to about 200,000 AMU; and
   wherein the shale hydration inhibition agent and the shale encapsulator are present in sufficient quantities to reduce the swelling of the subterranean formation in the presence of water.

* * * * *